UNITED STATES PATENT OFFICE.

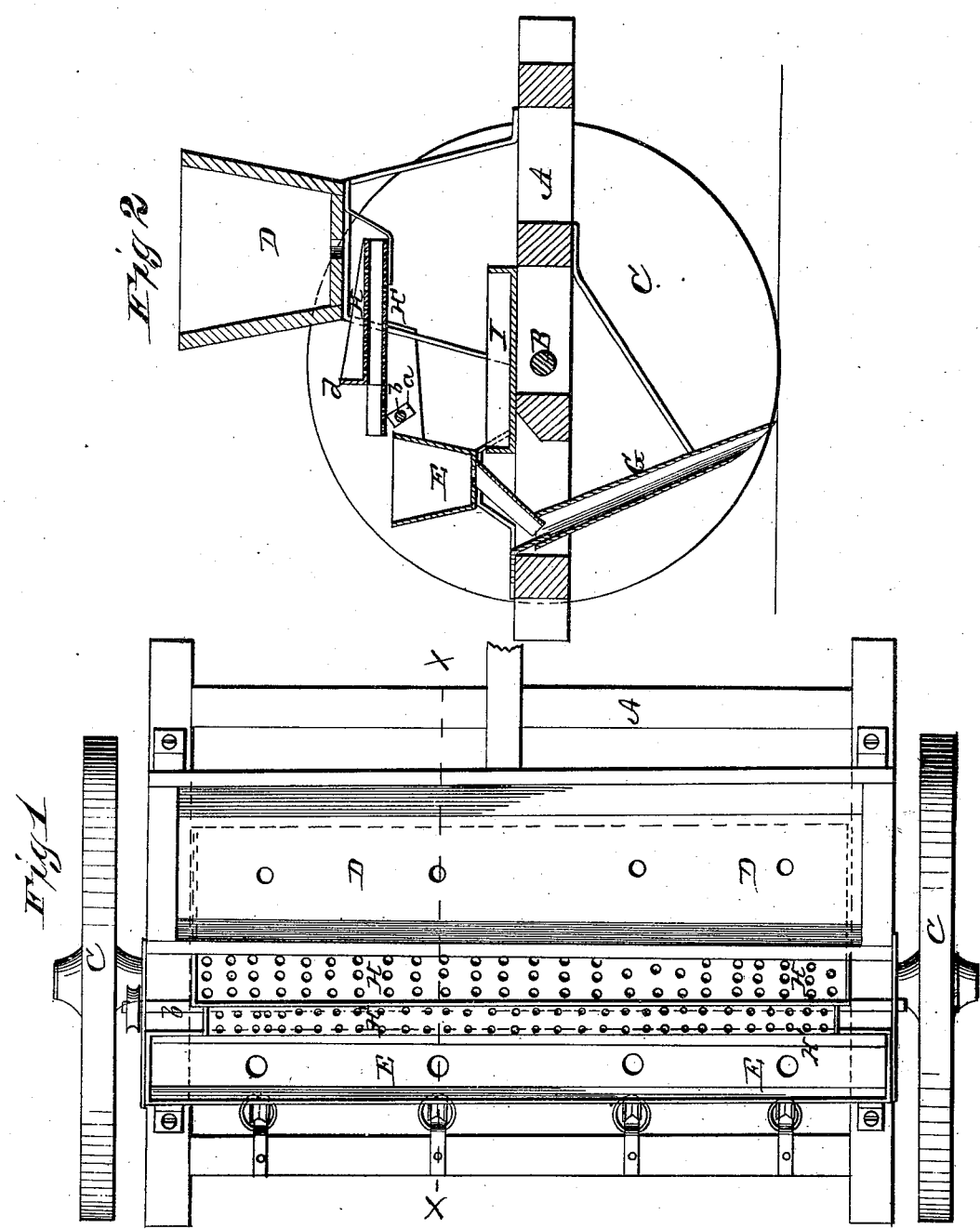

FLAVIUS J. UNDERWOOD, OF NORTH SPRINGFIELD, MISSOURI.

IMPROVEMENT IN SEED-PLANTERS.

Specification forming part of Letters Patent No. 180,079, dated July 18, 1876; application filed February 3, 1876.

*To all whom it may concern:*

Be it known that I, FLAVIUS J. UNDERWOOD, of North Springfield, in the county of Greene and State of Missouri, have invented certain new and useful Improvements in Seed-Planters; and I do hereby declare that the following is a full, clear, and exact description thereof, reference being had to the accompanying drawings, and to the letters of reference marked thereon, which form part of this specification.

My invention relates to seed-sowers, and has for its object to screen from wheat or other seed to be sown all trash or foul seed, so as to insure evenness in sowing, and not to sow anything but pure seed; and to this end the nature of my invention consists in combining one or more screens with the seeder, and in the construction and general arrangement of parts, as will be hereinafter more fully set forth.

In order to enable others skilled in the art to which my invention appertains to make and use the same, I will now proceed to describe its construction and operation, referring to the annexed drawing, in which—

Figure 1 is a plan view of a seed-sower embodying my invention. Fig. 2 is a cross-section of the same through the line $x\ x$, Fig. 1.

A represents a suitable frame secured upon an axle, B, having a driving-wheel, C, on each end. On the frame A are supported two seed-boxes, D and E, at different elevation, the front box D being a suitable distance above and in front of the box E. From the bottom of the box E the seed passes through suitable openings and troughs to the conductors G G and to the ground. Between the two boxes D E are arranged two screens, H H', one above the other, the front edges being flexibly connected under the bottom of the front box D, while the rear edge of the bottom screen H' is supported upon knockers $a\ a$, secured upon a rotating shaft, $b$. This edge of the bottom screen is located immediately over the front edge of the lower or rear box E. The top screen H has an upward-projecting rim or flange, $d$, around its ends and rear side, while the top surface of the lower screen H' is entirely smooth. Below the screens, on the frame A, rests a pan or shallow box, I.

The seed to be sown is placed into the box D, and is let out through openings in its bottom to the screens about as fast as it is sown from the box E. The first or upper screen E takes out all straw, sticks, heads, or other trash, and the lower screen H' takes out all the foul seed, which falls into the pan I below, so that nothing but pure seed passes into the box E to be sown. The slowness with which the seed passes over the screens causes the seed to be perfectly cleaned, the screens being agitated by means of the knockers $a\ a$; but, in lieu of said knockers, any shaking mechanism may be used.

A screen attachment of this character may be used both on a drill and broadcast sower.

Having thus fully described my invention, what I claim as new, and desire to secure by Letters Patent, is—

The combination, in a seed-sower, of the seed-boxes D and E, the intermediate separating-screens H H', a knocking or shaking mechanism, and the conductors G under the box E, whereby the seed is separated between two hoppers and carried to the earth through the conductors, substantially as and for the purposes herein set forth.

In testimony that I claim the foregoing as my own I affix my signature in presence of two witnesses.

F. J. UNDERWOOD.

Witnesses:
T. M. ERVAY,
B. F. WATKINS.